Nov. 7, 1950  M. A. CLARK  2,528,741
DRAG SCRAPER

Filed Oct. 22, 1948  2 Sheets-Sheet 1

INVENTOR.
MARION A. CLARK
BY Huebner, Beehler,
Worrel, Herzig & Caldwell
ATTORNEYS Nov. 7, 1950   M. A. CLARK   2,528,741
DRAG SCRAPER
Filed Oct. 22, 1948   2 Sheets-Sheet 2
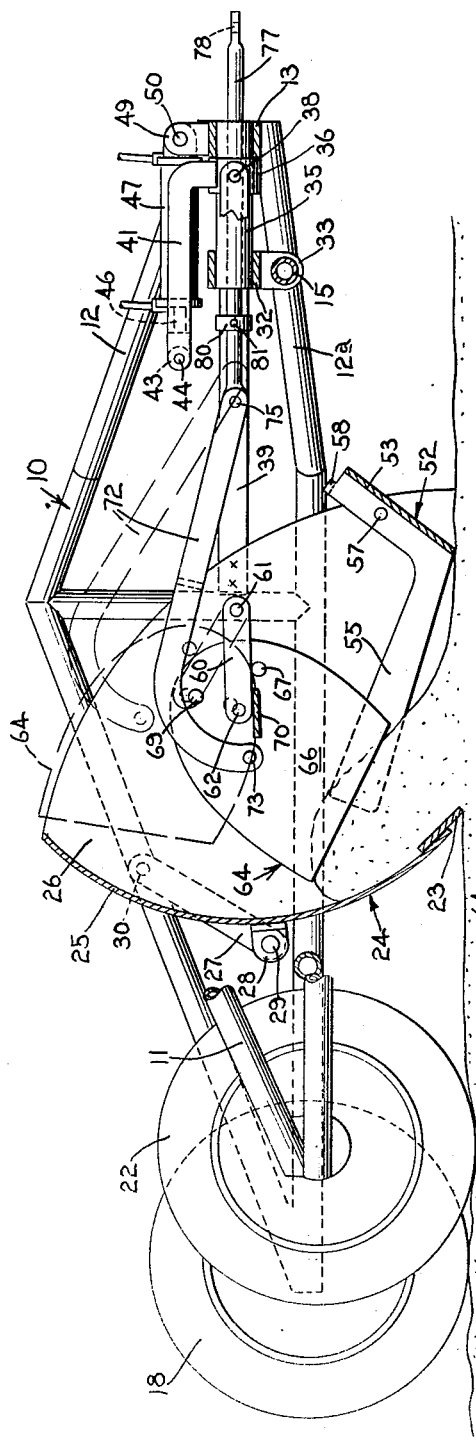
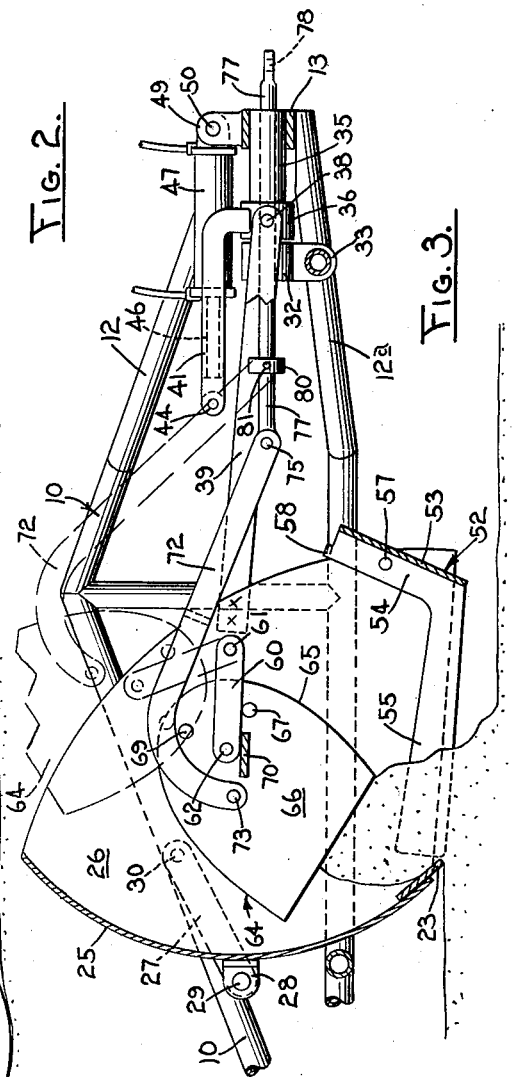
Fig. 2.
Fig. 3.
INVENTOR.
MARION A. CLARK
BY Huebner, Beehler,
Worrel, Herzig & Caldwell
ATTORNEYS Patented Nov. 7, 1950

2,528,741

UNITED STATES PATENT OFFICE 2,528,741

DRAG SCRAPER

Marion A. Clark, Tulare, Calif.

Application October 22, 1948, Serial No. 55,978

9 Claims. (Cl. 37—129)

1

This invention relates to drag scrapers and has as its particular objective to design a drag scraper having increased load capacity.

In the conventional drag scraper it has been found that because of small load limits it is frequently necessary to make a large number of passes over the ground to be scraped in order to move the desired quantity of soil. It has also been found that the usual drag scraper cannot carry a very large load of dry, powdered soil because the soil tends to sift out under the side edges of the drag scraper and will not pile up in the scraper bucket, causing the powdered soil to flow ahead of the scraper.

It has also been found that in the usual drag scraper any corrugated effect in the soil to be scraped, or other unevenness, is transferred to the scraper blade and hence to the surface after the soil has been scraped.

In view of these deficiencies and difficulties of the conventional drag scraper, it is one purpose of the present invention to provide a means for increasing the load carrying capacity of drag scrapers.

It is another object of the present invention to provide a drag scraper having a scraper which is supplied with an auxiliary bucket pivoted therein that is movable to a position to carry an increased load therein.

It is a further object of my invention to provide an auxiliary bucket for a scraper which is pivotal to a raised position by means of the draft force moving the load.

It is also an object of my invention to provide an auxiliary bucket for a drag scraper in which the bucket is automatically moved to a raised load carrying position by the pull of a tractor or the like moving the load within the scraper and auxiliary bucket, combined with means for simultaneously emptying both the scraper and the auxiliary bucket.

Another object of the invention is to provide means for retaining large quantities of dry powdered soil within the scraper and auxiliary bucket.

A further object of my invention is to provide means for preventing dry powdered soil from pouring out ahead of the scraper and for preventing the powdered soil from sifting under the side portions of the scraper.

A still further object of the invention is to provide for offset wheels supporting the scraper frame and scraper thereon whereby any unevenness or corrugations in the soil to be scraped is not transferred to the resultant surface after the soil is scraped therefrom.

Other objects and advantages of the present invention will become apparent from the following description taken in connection with the accompanying drawings in which:

2

Fig. 2 is a vertical longitudinal sectional view through the scraper showing the scraper in its normal scraping position in full lines and showing in phantom the auxiliary bucket in one of its positions while filled.

Fig. 3 is a fragmentary vertical, longitudinal, sectional view similar to Fig. 2, but showing the auxiliary bucket in completely loaded position in phantom lines and showing the auxiliary bucket and scraper in emptying position in full lines.

Figure 1:
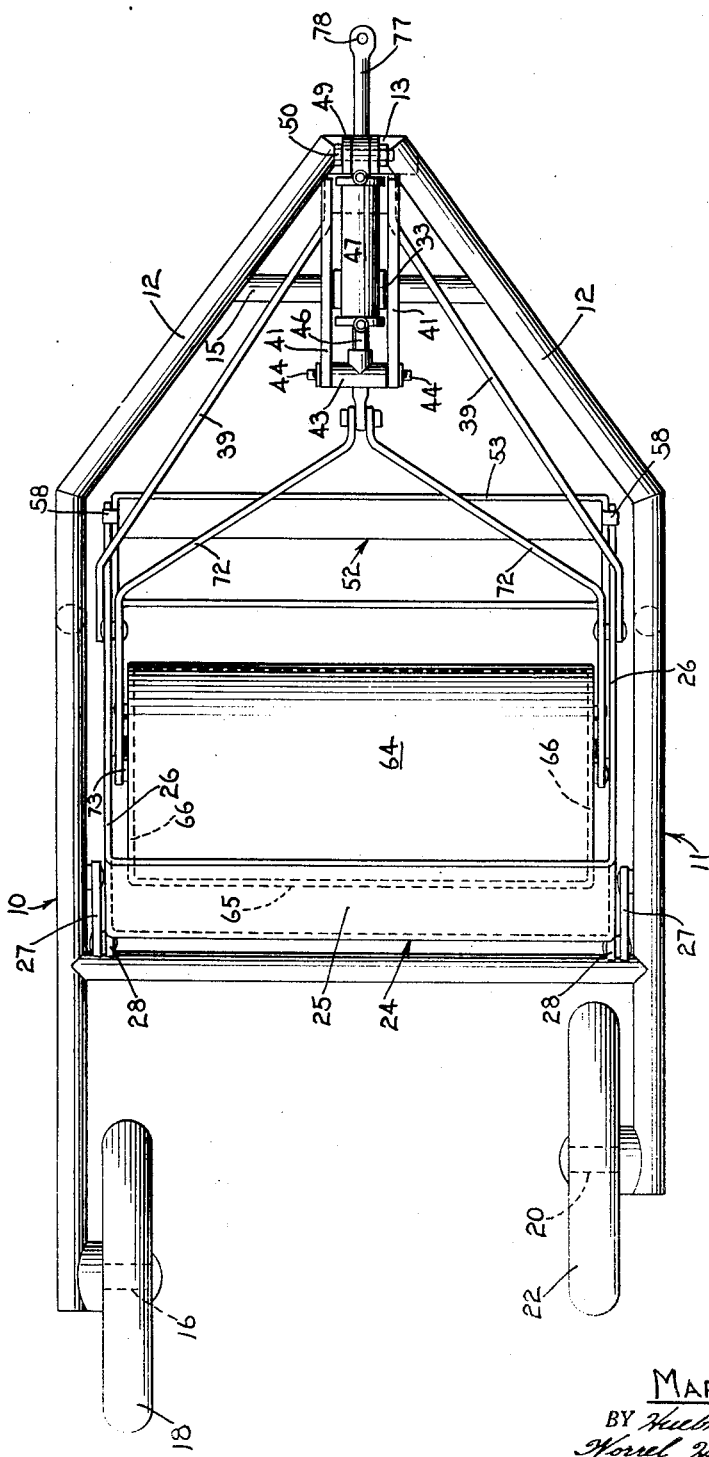
Fig. 1 is a top plan view of a scraper made in accordance with the principles of my invention.

Referring to the details of the drawing:

The scraper is provided with vertical side frames 10 and 11 which converge at their forward ends in the frame members 12 and 12a. The forward ends of frame members 12 and 12a are secured to a socket member 13 extending therebetween. A transverse support member 15 extends between the frame members 12a. The frame member 10 extends rearwardly to a greater extent than the frame member 11, and has a horizontal inwardly extending axle 16 secured thereto with a wheel 18 rotatably mounted thereon. The other frame member 11 has a horizontal inwardly extending axle 20 secured thereto and a wheel 22 rotatably mounted thereon. The wheels 18 and 22 support the frame members 10 and 11 for longitudinal movement.

A scraper indicated generally by reference numeral 24, comprises blade 23, a partially cylindrical bucket 25 and a pair of vertical, forwardly extending, sheet metal sides 26, each of which is arcuate at its forward upper edge and relatively straight on its lower edge.

The scraper 24 is mounted between the frame members 10 and 11 for movement to a scraping position or to an emptying position and is pivotally supported by a pair of links 27 pivotally attached at 29 at their lower rear ends to a pair of brackets 28, each of which is welded to the rear side of the arcuate back portion 25 of the scraper. The links are pivotally connected at 30 to the inner side of each of the side frame members 10 and 11.

The forward portion of the scraper is supported by providing a forwardly extending bar 39 secured to each side of the scraper by welding or other suitable secure fastening and supporting the forward end thereof by a socket member 32 having a sleeve portion 33 axially at right angles thereto supported by the frame cross member 15.

The forward edge of the scraper is supported by means of a pair of bars 39, one of which is attached to each side 26 of the scraper 24. The bars 39 are in turn supported at their forward ends by a pin 38 supported on a sleeve 36. The sleeve 36 is slidably mounted on a cylinder 35 having one end thereof disposed through the socket 13 and the other end supported by the socket member 32.

Means are provided for moving the scraper 25 forwardly or rearwardly to its operative or to its emptying position by providing the longitudinally slideable sleeve 36 with a pair of spaced parallel upwardly and rearwardly extending arms 41 integral therewith. A bearing member 43 is rotatably connected between these spaced arms. The bearing member has trunnions 44 extending outwardly therefrom into openings in each of the arms 41.

A piston rod 46 of a hydraulic control cylinder 47 is connected to the bearing member 43 and the hydraulic control cylinder is pivotally connected to a pair of spaced upwardly extending ears 49 formed integrally with the socket member 13 by means of a bolt 50 extending through the ears 49 and through an eye formed on the hydraulic control cylinder. Thus by actuation of the hydraulic ram longitudinal movement is imparted to the sleeve 36, slideably located on the tubular member 35, thereby moving the scraper to its various positions.

A damper 52 is positioned near the forward lower edge of the scraper having a substantially vertical front plate portion 53 with rearwardly extending spaced parallel side plates 54 and a narrowed side plate 55 extending rearwardly from a lower portion of the side plate 54 of the damper. The damper is pivoted to the side plates 26 of the scraper as indicated at 57. The rear portion of the damper gravitates downwardly and rests normally on the ground as the scraper is drawn over the soil to be scraped. Downward pivotal motion of the damper is limited by providing an outwardly extending ear 58 at an upper portion of each side of the plates 54 of the damper which engages the arcuate edge of the side plates 26 of the scraper.

The pivoted damper 52 is adapted to prevent light powdery soil from flowing out flatly ahead of the scraper thereby permitting the scraper to hold a larger charge of this type of soil. The narrowed side plates 55 of the damper 52 when in normal downwardly position are intended to prevent light powdery soil from sifting from the scraper under the lower edge of the side plates 26 thereof.

Means is provided for increasing the capacity of the scraper which comprises an auxiliary bucket 64 supported by a pair of links 60, each pivotally connected at 61 against the inner face of each of the side plates 26 of the scraper 24. The links 60 normally extend rearwardly and substantially horizontal with the rear end thereof slightly lower than the forward end. The rear end thereof normally rests on a bracket 70 which is attached to the inner face of each of the side plates 26. The rear end of each of the links 60 is pivotally connected at 62 to ends 66 of the bucket 64.

The bucket 64 is limited in its pivotal action by means of the links 60. The pivotal motion is limited in a counter-clockwise direction by a pin 67 extending outwardly from each end 66 of the bucket which engage the underside of the links 60 thereby limiting the downward pivotal motion of the bucket. Another pin 69 extends outwardly from each end of the bucket which is arcuately spaced from the pin 67 whereby the bucket is limited in its clockwise rotation as viewed in Figs. 2 and 3. A pair of gooseneck links 72 are pivotally connected at 73, one to each end 66 of the bucket 64. Each pivotal connection 73 of each gooseneck link 72 is located below the plane of alignment of the pivotal connections 61 and 62 of the pair of links 60 whereby a toggle effect is obtained.

The forward end of each of the links 72 is pivotally connected at 75 to the rear terminal end of a rod 77 which is longitudinally slideable in the tubular member 35 and has a draft opening 78 therethrough at its forward end. A stop collar 80 is located on the rod 77 and is permanently located thereon by means of a pin 81 passing therethrough.

It will be noted that each pivot point 62 of the links 60 is normally slightly below the plane of alignment between the pivot point 61 thereof and the axis of the rod 77.

Operation

In order to place the drag scraper in operation the forward end of the rod 77 is connected to a tractor or other suitable prime mover through the connection opening 78. The hydraulic ram 47 is actuated moving the scraper 24 to the position as shown in Fig. 2 with the bucket 64 in depending position as shown in full lines.

While the scraper is moved over the ground to be scraped, the damper 52 pivotally mounted against the inner sides of the ends 26 of the scraper is normally in down position, but as the lower forward edge of the vertical front plate thereof engages soil it is temporarily moved rearwardly allowing the damper to move thereover. The lower edge of the front vertical plate 53 of the damper 52 normally is located closely adjacent the ground and as soil is scraped within the scraper the damper prevents the soil from emptying out forwardly of the scraper. This action is especially desirable when dry powdery soil is scraped with the herein described scraper. When dry powdery soil is scraped it has a tendency to flow forwardly in a more or less flattened condition ahead of the scraper whereby the scraper cannot contain a very large quantity of this soil. With the use of the damper as described, this dry powdery soil is prevented from flowing forwardly past the damper 52 after it has once entered into the scraper.

The narrowed horizontal side plates 55 of the damper in their normal downwardly pivoted position extend close to the ground. Therefore the soil, after it is scraped, will not sift outwardly below the lower edge of the side plates 26.

As the scraper is drawn over the ground by means of the forward pull on the slideable rod 77, a forward horizontal force is exerted on the auxiliary bucket 64 at its pivotal connection 73 of the gooseneck links 72. This exertion on the auxiliary bucket 64 tends to pivot the bucket counter-clockwise, as viewed in Figs. 2 and 3, forcing each stop pin 67 against the lower side of one of the links 60. Since the bucket is limited in its counter-clockwise rotation and since each pivot point 73 is below the plane of alignment of the pivot points 61 and 62 the bucket is held in this downwardly extending normally counter-clockwise pivoted position while the scraper is being drawn forward. This normal position is shown in full lines in Fig. 2.

As the scraper is drawn forward a quantity of soil is accumulated ahead of the blade 23 within the scraper 24. After a predetermined quantity of soil has been accumulated within the scraper any additional accumulation of soil therein moves upwardly within the auxiliary bucket 64 and forceably against the rear face thereof in its inverted position, as shown in Fig. 2. When a sufficient quantity of soil has accumulated against the rear face of the bucket, the force thereof against the bucket rotates the bucket clockwise around the pivot point 62 of each of the pivotally connected links 60 until each stop pin 69 engages the upper side of one of the links 60. Further pulling by means of the tractor on the longitudinally slideable rod 77 pivotally rotates the pair of links 60 and the bucket 64 unitarily around the pivotal connection 61 to the sides 26 of the scraper until the bucket has moved to its upper loaded position as indicated by the phantom lines in Fig. 3 of the drawing with the stop collar 80 against the socket 32. The scraper may be thereafter drawn further again filling the scraper to its capacity with the auxiliary bucket carrying an additional load in its upwardly extended loaded position. The scraper and auxiliary bucket remain in these same relative positions as long as the scraper is drawn forwardly and the hydraulic ram 47 is not oppositely actuated.

In order to empty the scraper and the auxiliary bucket 24, the hydraulic control cylinder is actuated to move the links 41 and the sleeve 36 rearwardly relative to the assembly, actually the frame 12 moves forwardly relative to the draft appliance. Motion of the sleeve 36 is transmitted to the scraper 24 by means of the rods or bars 39.

Motion of the scraper to the left in Fig. 1 or rearwardly of the assembly will cause simultaneous lifting because of the pivot links 21 which will allow the dirt load to escape from the scraper 24.

Movement of the scraper to the rear will also cause further rotation of the auxiliary bucket 64 as seen in phantom in Fig. 3, because the pivot point 75 remains fixed with respect to the frame of the assembly.

After the scraper has been emptied, the combined weight of the bucket 64 and its load is sufficient to cause the scraper to move forwardly relative to the frame and allow the bucket 64 to pivot counter-clockwise about the point 61 until the link 60 engages the ear 70 and then to rotate counter-clockwise about the point 62 until the pin 67 engages the link 60. It is clear that such action will cause emptying of the bucket 64, and prepare the scraper for further action.

From the foregoing it will be seen that I have invented a drag scraper which has a greater load carrying capacity than the conventional type of scraper and one in which the load carrying capacity is increased especially for the removal of light dry powdery soil. It will also be seen that I have devised a scraper in which any corrugated effect in the soil to be scraped is not transferred to the surface of the soil after it has been scraped.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent structures and devices.

Having described my invention, what I claim as new and desire to secure by Letters Patent is:

1. A drag scraper comprising a frame adapted for longitudinal movement, a scraper blade mounted transversely of the frame adapted to scrape soil against the forward side thereof on forward movement, an auxiliary bucket having an open side pivotally mounted forwardly of the scraper blade normally located with its open side extending rearwardly and downwardly adjacent the scraper blade, and means operable by a forward pull on the scraper for moving the bucket to upwardly and rearwardly extended containing position after a predetermined quantity of soil has accumulated ahead of the scraper blade.

2. A drag scraper comprising a frame adapted for longitudinal movement, a scraper blade mounted transversely of the frame adapted to scrape soil against the forward side thereof on forward movement, an auxiliary bucket having an open side pivotally mounted forwardly of the scraper blade normally located with its open side extending rearwardly and downwardly adjacent the scraper blade, and draft means movable relatively longitudinally of the frame connected to the said bucket for moving the bucket to an upwardly and rearwardly extending containing position after a predetermined quantity of soil has accumulated ahead of the scraper and within the bucket.

3. A drag scraper comprising a frame adapted for longitudinal movement, a scraper having spaced parallel forwardly extending vertical side members and being mounted on the frame for vertical movement relative thereto whereby it is movable to scraping and to emptying position, a link pivotally connected against the inner face of each of the side members of the scraper in horizontal alignment, means extending inwardly from the sides of the scraper adapted to support the links in rearwardly substantially horizontal extending position, a bucket pivotally mounted on a transverse axis between rearward portions of the links, means for limiting the pivotal motion of the bucket on the links, means for pulling the frame movable longitudinally relative thereto connected to the bucket rearwardly and below the plane of alignment of the pivotal points of the links.

4. A drag scraper comprising a frame having a pair of longitudinally spaced frame members, said frame being supported at its rearward end by a pair of wheels one of which wheels is positioned forwardly of the other and being supported on its forward end by a drawbar, which said drawbar is slidably disposed through a socket secured to the forward end of said frame, a scraper bucket having forwardly extending side walls positioned intermediate the ends of said frame and transversely thereto and secured to said frame by means of a plurality of link members so that forward motion of said frame relative to the scraper bucket causes said scraper bucket to lift, a bar attached to the forward edge of said scraper bucket and operatively associated with a hydraulic piston adapted to control the position of said bucket, an auxiliary bucket pivotally secured within said scraper bucket and having an open face for the reception of dirt, a link member secured to the rear end of said drawbar and to said auxiliary bucket adapted to normally hold said auxiliary bucket with its open side down and adapted to lift said auxiliary bucket when said bucket is filled with dirt, and forced upwardly by the continued accumulation of dirt in the scraper bucket, and a damper plate pivotally secured to the leading edge of the sides of said scraper bucket adapted to prevent the spillage of dirt from said bucket.

5. A drag scraper comprising a frame, a scraper bucket swingably positioned transversely of said frame and secured to said frame by means of a plurality of pivot links, a hydraulic cylinder adapted to control the position of said scraper bucket, an auxiliary bucket having an open side positioned within said scraper bucket, said auxiliary bucket being positioned normally with its open side down and being adapted to pivot upwardly upon filling the scraper bucket and the auxiliary bucket with soil, said frame being supported at its rearward end by a pair of wheels one of which is positioned forward of the other.

6. A drag scraper comprising a frame, a scraper bucket movably positioned transversely of said frame and secured to said frame by means of a plurality of pivot links, a hydraulic cylinder adapted to control the vertical and horizontal position of said scraper bucket, an auxiliary bucket positioned within said scraper bucket and having an open side, said auxiliary bucket being positioned normally with its open side down being adapted to pivot upwardly upon filling the scraper bucket with soil, said frame being supported at its rearward end by a pair of wheels one of which is positioned forward of the other.

7. A drag scraper comprising a frame, a drawbar at the forward end thereof, a scraper bucket movably positioned transversely of said frame and secured to said frame by means of a plurality of links, a hydraulic cylinder adapted to control the vertical and horizontal position of said scraper bucket, an auxiliary bucket pivotally positioned within said scraper bucket and having an open side, said auxiliary bucket being normally held with its open side down by means of a toggle link attached between said auxiliary bucket and said drawbar being adapted to pivot upwardly upon filling the scraper bucket with soil, which soil forces said auxiliary bucket to pivot upwardly past dead center of said toggle link, said frame being supported at its rearward end by a pair of wheels one of which is positioned forward of the other.

8. In a drag scraper having a frame and a scraper bucket, means for increasing the load of said scraper, said means comprising an auxiliary bucket pivotally disposed within said scraper bucket and having an open side, said open side being held in a normally downward position by means of a toggle link and being adaptable to rotate to an up position upon filling the scraper bucket with dirt.

9. In a drag scraper having a frame, a drawbar, and a scraper bucket, means for increasing the load of said scraper, said means comprising an auxiliary bucket pivotally disposed within said scraper bucket and having an open side, said open side being held in a normally downward position by means of a toggle link connected between the auxiliary bucket and a draft appliance and being adaptable to rotate by the draft force applied thereto to an up position upon filling of the scraper bucket with dirt and by further accumulation of dirt in the scraper bucket sufficient to urge the auxiliary bucket upwardly past dead center of said toggle link.

MARION A. CLARK.

REFERENCES CITED

The following references are of record in the file of this patent:

UNITED STATES PATENTS

| Number | Name | Date |
|---|---|---|
| 1,891,427 | Le Bleu | Dec. 20, 1932 |
| 2,099,435 | Davenport | Nov. 16, 1937 |
| 2,301,516 | Brodersen | Nov. 10, 1942 |
| 2,306,066 | Le Bleu | Dec. 22, 1942 |
| 2,425,601 | Daniels | Aug. 12, 1947 |

FOREIGN PATENTS

| Number | Country | Date |
|---|---|---|
| 778,246 | France | Dec. 15, 1934 |